R. V. BARRY.
METAL WORKING MACHINE.
APPLICATION FILED OCT. 11, 1916.
1,283,453.
Patented Nov. 5, 1918.
2 SHEETS—SHEET 1.
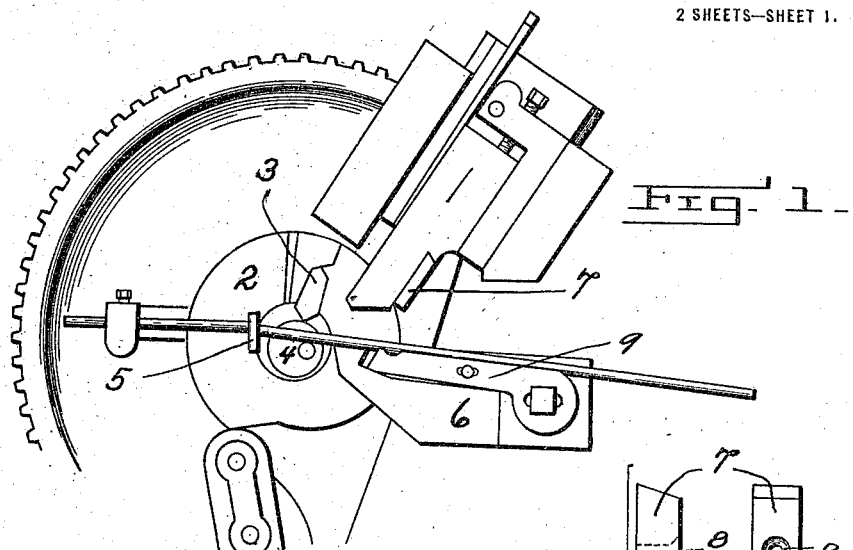
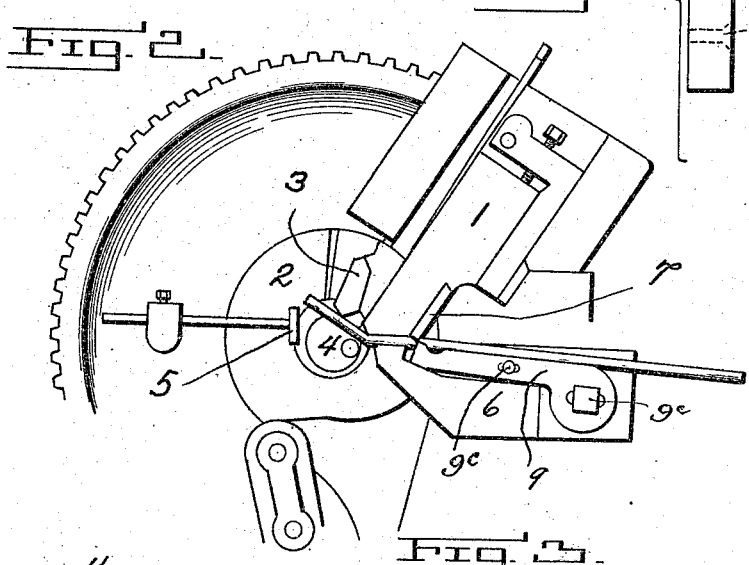
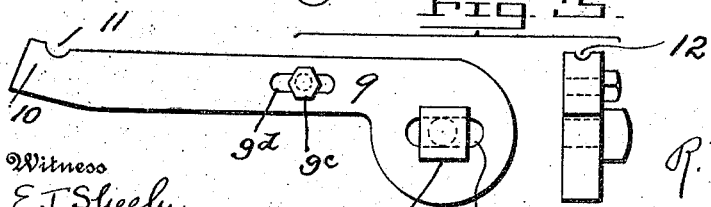
Witness
E. J. Sheely
Inventor
R. V. Barry
By James J. Sheely & Co.
Attorneys R. V. BARRY.
METAL WORKING MACHINE.
APPLICATION FILED OCT. 11, 1916.
1,283,453.
Patented Nov. 5, 1918.
2 SHEETS—SHEET 2.
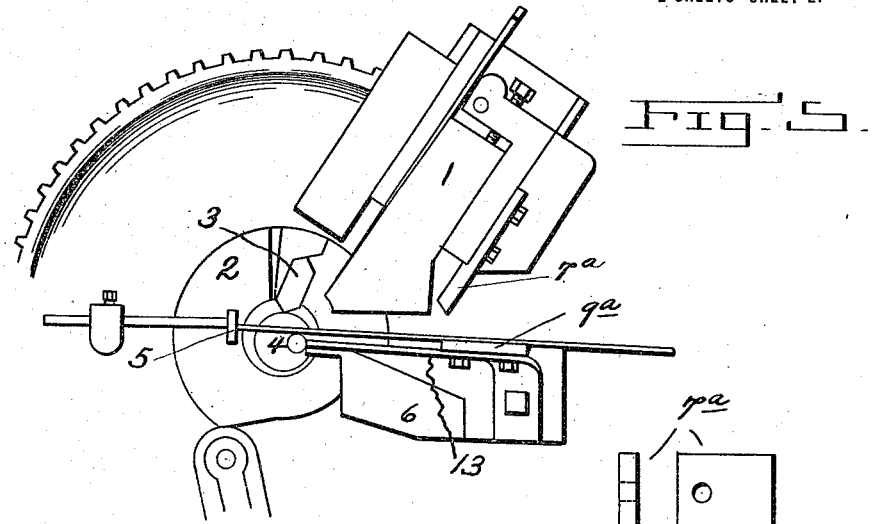
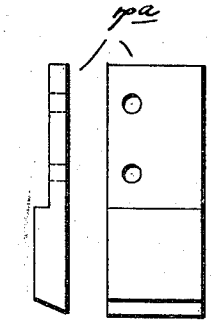
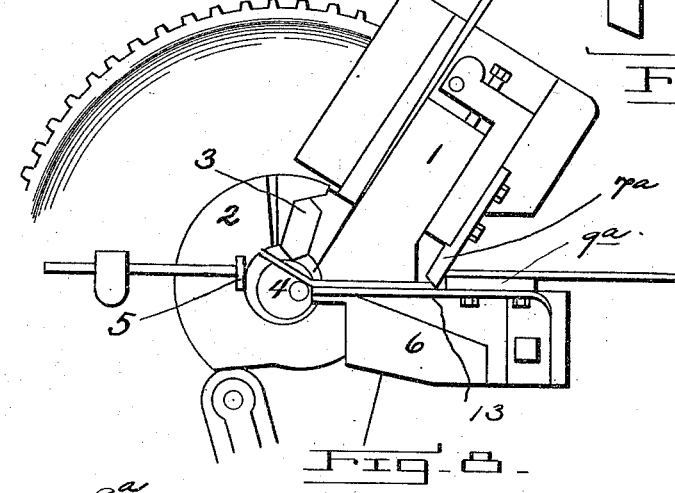
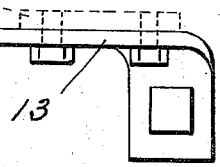
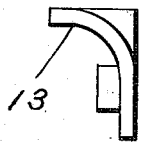
Witness
E. J. Sheely
Inventor
R. V. Barry
By James J. Sheehy & Co.
Attorneys

UNITED STATES PATENT OFFICE.

RICHARD V. BARRY, OF DAVENPORT, IOWA, ASSIGNOR OF ONE-FOURTH TO JOHN F. SCHROEDER, OF DAVENPORT, IOWA, AND ONE-FOURTH TO ERNEST R. SCHROEDER, OF STOCKTON, IOWA.

METAL-WORKING MACHINE.

1,283,453.     Specification of Letters Patent.     Patented Nov. 5, 1918.

Application filed October 11, 1916. Serial No. 125,056.

*To all whom it may concern:*

Be it known that I, RICHARD V. BARRY, a citizen of the United States, residing at Davenport, in the county of Scott and State of Iowa, have invented new and useful Improvements in Metal-Working Machines, of which the following is a specification.

My present invention relates to metal-working machines, and consists in the peculiar and advantageous machine, hereinafter described and claimed, calculated in one operation to bend and cut metal bars, either of circular or angular cross-section, thereby obviating the necessity of repeated handling of the work, and rendering the same expeditious and economical.

In the accompanying drawings, which are hereby made a part hereof:

Figure 1 is an elevation of so much of a metal working machine as is necessary to illustrate the application of my improvement when the machine is equipped to bend and cut flat stock or bars of angular form in cross section.

Fig. 2 is a similar view of the same with the working parts in different positions.

Fig. 3 comprises enlarged detail views of the lower cutting die included in the embodiment shown in Figs. 1 and 2.

Fig. 4 comprises detail enlarged views of the upper cutting die of said embodiment.

Figs. 5 and 6 are views, similar to Figs. 1 and 2, and showing the machine fitted for bending and cutting stock or bars of angular cross section.

Fig. 7 comprises detail enlarged views of the upper cutting die of the machine as shown in Figs. 5 and 6.

Fig. 8 comprises enlarged detail views of the combined die-support and stock support embraced in the embodiment of Figs. 5 and 6.

I have elected to show my improvement in and forming part of a well known eye-bender machine, which is not of my invention *per se*, but which machine constitutes the subject of Patent No. 582,283, dated May 11, 1897, but it is to be understood in this connection that my novel dies may be embraced in and combined with the working parts of analogous metal-working machines, without involving departure from the scope of my invention as defined in my appended claim.

As illustrated in Figs. 1, 2, 5 and 6, the machine alluded to comprises a reciprocatory head 1, a rotary face plate 2, a revolving die 3, an endwise movable mandrel 4, disposed at a right angle to the plane of the face plate 2, a gage 5, and a stationary die 6.

In the operation of the said machine as a bending machine purely, the operator places the bar or rod to be bent over the mandrel 4 and against the gage 5, and the machine is then operated, whereupon the head 1 descends and clamps the stock, and gives it its initial bend. At the same time the gage 5 is turned down out of the way. The revolving die 3 then wipes the stock around the mandrel 4, and the organized mechanism is reversed whereupon the head 1 is elevated or retracted, and the mandrel 4 is withdrawn so as to permit the completed piece to drop to the floor or into a receptacle provided for the reception of the same. This mode of operation, it is to be understood, is also true of the machine when the capacity of the machine is increased by the embodiment of my improvement, as will be now described.

In the embodiment of my invention shown in Figs. 1 and 2, the machine is intended to handle round stock, and, therefore, the head 1 is equipped at 7 with an upper cutting die, the said die being provided with a kerf of semi-circular form in cross section in its lower edge, as shown in Fig. 4, and being fastened to the head 1 by screws or other suitable means, driven through the apertures 8, Fig. 4, and into the head 1. Also in said embodiment, the stationary die 6 has fastened to it a lower cutting die 9, Figs. 1, 2 and 3, the fastening being effected by screws 9$^c$ or other suitable means driven through slots 9$^d$ in the die 9 and into the stationary die 6, and the said die being characterized by a slightly upturned inner end 10, a transverse groove 11 therein, and a longitudinal groove or channel 12, of semi-circular form in cross section, the latter to seat the round bar or stock, as shown in Figs. 1 and 2.

The operation of the machine provided with the dies 7 and 9 is that before described with the addition that incidental to the downward movement of the head 1 as described, the bar will be cut synchronously with the initial bending of the same, after the manner shown in Fig. 2, and in that way the production of the bent and cut article will be materially cheapened.

In the embodiment shown in Figs. 5 and 6, the head 1 is provided with an upper cutting die 7ª of the type shown in Fig. 7, and a bracket 13 is connected to the stationary die 6, on which bracket is fastened a lower cutting die 9ª, Figs. 5 and 6.

The machine shown in Figs. 5 and 6 is adapted to cut and bend flat stock, but its operation is the same as the round-stock machine of Figs. 1 and 2, and it is therefore deemed unnecessary to reiterate the same.

It will be gathered from the foregoing that a bending machine equipped in accordance with my invention is simple and inexpensive in construction, and yet is adapted to perform the two-fold function of cutting and bending in one operation, with the result that handling of the stock is reduced to a minimum, and the cost of production materially cheapened.

Having described my invention, what I claim and desire to secure by Letters Patent, is:

An organized mechanism in a metal working machine, comprising a stationary die, a head movable toward and from the stationary die and constructed and arranged in coöperation with the same to clamp and initially bend the stock, a lower cutting die on the stationary die and an upper cutting die on the movable head; said cutting dies being disposed back of the stationary die and head, respectively, and constructed and arranged to cut the stock synchronously with said clamping and initial bending of the stock, a gage in front of and spaced relation to the stationary die and the head, and means between the stationary die and the head, on the one hand, and the gage, on the other, constructed and arranged to further bend the forward portion of stock subsequently to the clamping and initial bending, and cutting of the stock and then release said portion and permit it to drop, whereby when the movable head recedes from the stationary die, the fully bent cut-off portion of stock is free to drop, and the following portion of stock may be advanced between the stationary die and the head and to the gage in readiness for another operation.

In testimony whereof I have hereunto set my hand in presence of two subscribing witnesses.

RICHARD V. BARRY.

Witnesses:
J. C. HALL,
LEO. W. KOENIGSAECKER.

Copies of this patent may be obtained for five cents each, by addressing the "Commissioner of Patents, Washington, D. C."